C. CHRISTIANSEN.
AUTOMOBILE WHEEL POSITIONING DEVICE.
APPLICATION FILED OCT. 29, 1915.
1,225,109.
Patented May 8, 1917.
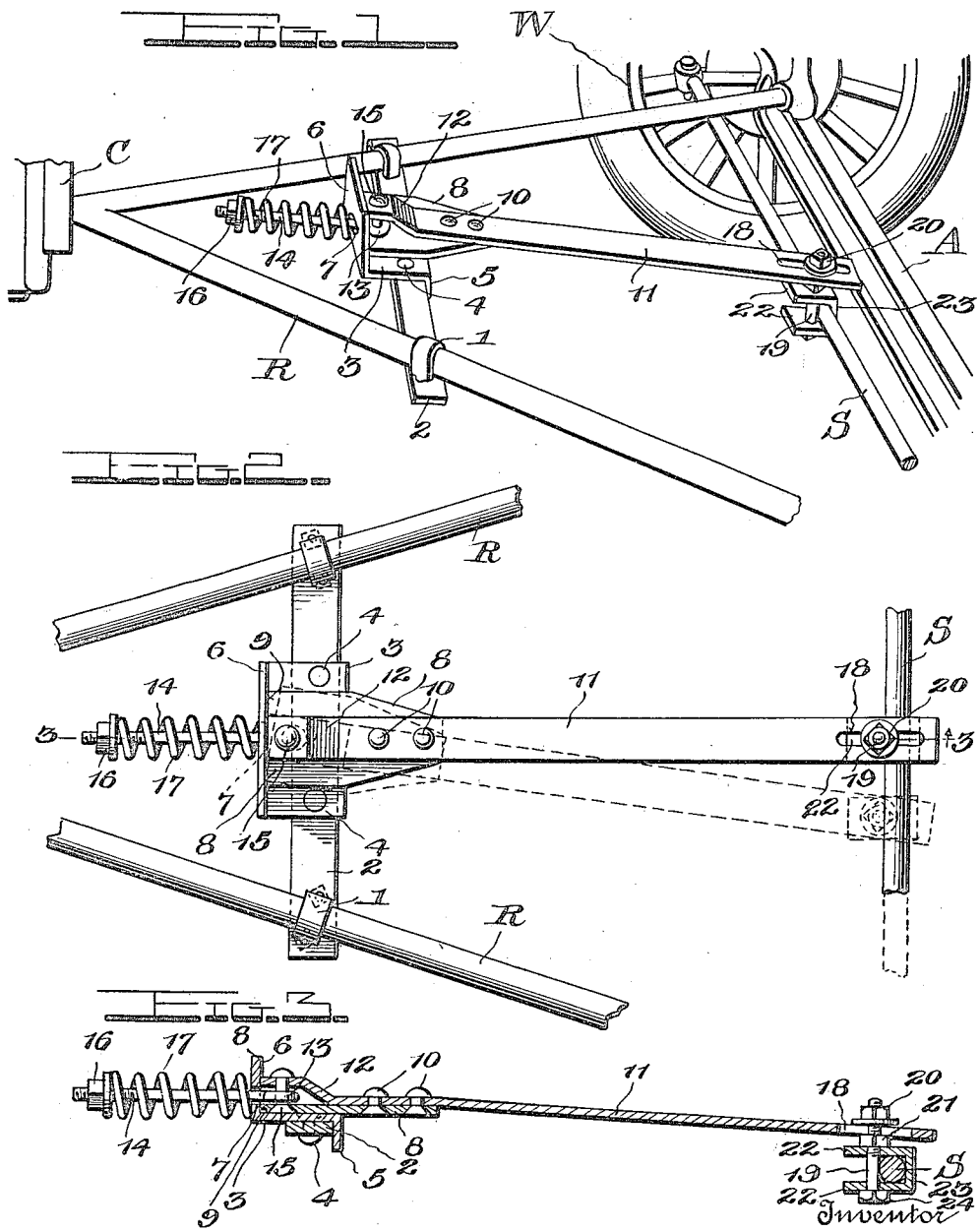
Witnesses
Chas. L. Griesbauer.
C. Christiansen,
Inventor
By H. B. Willson & Co.
Attorneys

UNITED STATES PATENT OFFICE.

CHRISTIAN CHRISTIANSEN, OF SIOUX FALLS, SOUTH DAKOTA.

AUTOMOBILE-WHEEL-POSITIONING DEVICE.

1,225,109.  Specification of Letters Patent.  Patented May 8, 1917.

Application filed October 29, 1915. Serial No. 58,599.

*To all whom it may concern:*

Be it known that I, CHRISTIAN CHRISTIANSEN, a citizen of the United States, residing at Sioux Falls, in the county of Minnehaha and State of South Dakota, have invented certain new and useful Improvements in Automobile-Wheel-Positioning Devices; and I do declare the following to be full, clear, and exact description of the invention, such as will enable others skilled in the art to which it appertains to make and use the same.

My invention relates broadly to improvements in automobile accessories and more particularly to a device so designed as to retain the front wheels of light motor vehicles, particularly Ford machines, in a neutral position in which they aline with the rear wheels.

The object of the invention is to provide a device of the class specified which, although being of extremely simple and inexpensive formation, will be highly efficient and durable and will possess a number of advantageous characteristic.

With this general object in view, the invention resides in certain novel features of construction and in unique combinations of parts to be hereinafter fully described and claimed, the descriptive matter being supplemented by the accompanying drawing wherein like reference characters designate corresponding parts throughout the several views and wherein:

Figure 1 is a perspective view of the device showing the application thereof;

Fig. 2 is a top plan view of the device and coacting parts of an automobile;

Fig. 3 is a longitudinal section as viewed on the plane indicated by the line 3—3 of Fig. 2.

In this drawing, a portion of a Ford automobile is illustrated for the purpose of disclosing the application of the invention. A indicates the front axle of the machine, W one of the front wheels thereof steered at will by endwise shifting of the steering rod S, and R indicates the usual V-shaped radius rod extending rearwardly from the axle A to the fly-wheel casing C.

Secured at its opposite ends to the arms of the radius rod R, preferably by clips 1, is a transverse anchor bar 2 to whose center a plate 3 is secured by rivets or the like 4, the front end of said plate being bent downwardly at 5 into contact with the front edge of the bar 2 to relieve unnecessary strain from the rivets 4, while the rear end of said plate is bent upwardly to form an abutment 6 having at its center a transversely elongated slot 7. Resting on the plate 3 is a suitably shaped rocker plate 8 having its rear edge 9 disposed in contact with the front side of the abutment 6 as clearly shown in Figs. 2 and 3. The front end of the plate 8 is preferably decreased in width and secured by rivets or the like 10 to a horizontal longitudinally extending arm 11 adjacent one end of the latter, said end being offset vertically at 12 and positioned above the rear end portion of the plate 8.

The offset portion 12 and the plate 8 receive therebetween an eye 13 carried by the front end of a rod 14 which extends slidably through the slot 7, a rivet 15 or other appropriate fastener being passed through said offset portion, the plate, and the intervening eye. The rear end of the rod 14 carries a stop 16 which is preferably in the from of a nut, a coil spring 17 being compressed between said stop and the abutment 6, whereby the tension of said spring is exerted to normally retain the rear edge of the plate 8 in contact with the aforesaid abutment but to allow such plate to rock away from said abutment on its rear corners as shown in dotted lines in Fig. 2.

The front end of the arm 11 is slotted longitudinally at 18 and receives therein the upper end of an upright bolt 19, the nut 20 of said bolt being disposed above the arm while a stop nut 21 is threaded on said bolt immediately beneath the arm. The portion of the bolt 19 beneath the nut 21 passes through the parallel arms 22 of a U-shaped clip 23 which receives therein the steering rod S and the bolt head 24 on the lower end of said bolt, contacts with the under side of said clip. By this means, the one bolt 19 serves as a pivotal connection between the arm 11 and the steering rod S and as means for securing the clamp 23 to said rod.

The device constructed as above described will retain the steering rod S in a neutral position, since the tension of the spring 17 holds the arm 11 normally against vibrating laterally to any appreciable extent. However, when the rod S is shifted endwise to steer the machine, the rocker plate 8 may swing laterally around its rear corners as shown in dotted lines in Fig. 2. Thus it will be evident that the operator of the machine is relieved of considerable unnecessary work in retaining the wheels W so positioned as to cause said wheels to travel in strict alinement with the rear wheels.

In the drawings, certain specific details of construction have been shown for the attainment of probably the best results, but obviously, numerous changes may be made within the scope of the invention without sacrificing any of the advantages thereof.

I claim:—

1. An automobile wheel positioning device comprising an apertured abutment to be secured to an automobile at a point spaced longitudinally from the transverse steering rod thereof, a rocker plate having one edge bearing against the abutment, an arm secured adjacent one end to said rocker plate and having said end offset and spaced therefrom, a rod passing through the aperture in the abutment and having one end disposed between the arm and the plate, a fastener passing through the arm, the plate and the intervening rod, a stop on the other end of the rod, and a spring interposed between the stop and the abutment.

2. An automobile wheel positioning device comprising a bar to be secured to an automobile at a point spaced longitudinally from the transverse steering rod thereof, a plate secured to said bar and having one of its end portions extended at an angle to the body of the plate to provide an abutment, the latter being formed with an opening, a rocker adjacent the plate and disposed in contact with the abutment, a rod pivoted to the rocker and extending through the opening in the aforesaid abutment, a stop on said rod, a spring interposed between the stop and said abutment, and a rigid arm extending from the rocker and adapted to be connected with the steering rod of the automobile.

3. An automobile wheel positioning device comprising a horizontal bar to be secured to an automobile at a point spaced longitudinally from the transverse steering rod thereof, a plate secured to said bar and having its rear end bent upwardly to form an abutment, the latter having therein an aperture, a rocker plate resting on the aforesaid plate and having its rear edge disposed in contact with the abutment, a rigid arm secured adjacent its rear end to the rocker plate and having said end offset upwardly and spaced from said plate, the other end of said arm being adapted for connection with the steering rod of the automobile, a rod extending through the aperture in the abutment and having its front end interposed between the offset end of the arm and the rocker plate, a fastener passing through said offset end, through the plate, and through the intervening end of the rod, a stop on the rear end of the rod, and a spring interposed between said stop and the abutment.

4. The combination with the running gear of an automobile including a V-shaped radius rod and a transverse steering rod adjacent the front end thereof; of a transverse horizontal bar secured at its ends to the arms of said V-shaped radius rod, an abutment carried by the intermediate portion of said bar and elongated longitudinally thereof, a rocker bearing against said abutment, spring means for yieldably retaining said rocker in a neutral position in respect to the abutment, and a rigid longitudinally disposed arm joined at its rear end to said rocker, said arm having a sliding connection at its front end with the steering rod.

In testimony whereof I have hereunto set my hand in presence of two subscribing witnesses.

CHRISTIAN CHRISTIANSEN.

Witnesses:
THEODORE N. FEYDER,
BEATRICE BROWN.

Copies of this patent may be obtained for five cents each, by addressing the "Commissioner of Patents, Washington, D. C."